United States Patent [19]

Angell

[11] 4,429,463
[45] Feb. 7, 1984

[54] MACHINIST ELECTRO-MECHANICAL DYNAMIC DATUM POINT LOCATOR TOOL

[76] Inventor: Bruce R. Angell, 17216 195h Pl. N.E., Woodinville, Wash. 98072

[21] Appl. No.: 313,288

[22] Filed: Oct. 21, 1981

[51] Int. Cl.$^3$ .............................................. G01B 5/25
[52] U.S. Cl. .............................. 33/169 C; 33/172 D; 33/180 R
[58] Field of Search ............. 33/169 C, 174 Q, 180 R, 33/172 D

[56] References Cited

U.S. PATENT DOCUMENTS

| 1,040,715 | 10/1912 | Mann | 33/169 C |
|---|---|---|---|
| 1,984,864 | 12/1934 | Cole et al. | 33/169 C |
| 2,109,976 | 3/1938 | Pierce, Jr. | 33/169 C |
| 2,451,904 | 10/1948 | Beatty | 33/169 C |
| 2,490,483 | 12/1949 | Simer | 33/169 C |
| 3,370,356 | 2/1968 | Jend | 33/169 C |
| 3,470,618 | 10/1969 | Richer | 33/169 C |
| 3,499,226 | 3/1970 | Hopkins | 33/169 C |
| 3,999,299 | 12/1976 | Johnson | 33/169 C |
| 4,043,046 | 8/1977 | Thomas | 33/169 C |

OTHER PUBLICATIONS

Sales Publication: "New Tool Report", by Lam Tool Co., ©1981.

Primary Examiner—Willis Little
Attorney, Agent, or Firm—Roy E. Mattern, Jr.

[57] ABSTRACT

An electro-mechanical dynamic datum point locator tool is provided to determine x and y axes datum points on a workpiece. The locator tool is a cylinder for placement, for example, in an adjustable chuck in a mill head of a milling machine. A cylindrical tip assembly depends from the cylinder and is flexibly supported for eccentric to concentric rotation during contact with the edge of a workpiece which is held in place on the bed of the milling machine. During rotation of the locator tool, a light emitting diode emits light from the circumference of the cylinder whenever the initially eccentrically placed cylindrical tip touches the edge of the workpiece. As the edge of the workpiece is moved closer to being in line with the centerline of the mill head of the milling machine, the cylindrical tip is reactively moved progressively toward its concentric rotating position. During this return movement of this tip, the light emitting diode stays on longer and appears to the machinist as a progressively increasing arc of light. Soon its spot source of light is continuously turned on by virtue of the speed of rotation of the cylinder, the light appears to the machinist as a continuous ring or halo of light, indicating that the center line of the collet and the turning head of the milling machine is only away from the edge of the workpiece by a distance equal to one half of the diameter of the tip of the locator tool. The cylinder of the locator tool preferably has an electrical conductive outer tubular sleeve with an interior preformed non conductive plastic hollow sleeve made in two longitudinal halves. Within the plastic hollow sleeve is an assembly of various electro-mechanical components. An insulated collar having a small central opening is positioned at the bottom of the cylinder and is fitted with a light emitting diode at its circumference. A cylindrical tip assembly is inserted through this central opening and secured in place by a flexible tension spring. During rotational contact of the tip assembly with the edge of the workpiece, the light signal circuit is completed via the milling machine and back through the locator tool and its light emitting diode. In an alternative embodiment, this cylindrical tip assembly may be adapted with a surface contacting ball to determine datum points on the top of the workpiece with respect to the z axis.

9 Claims, 14 Drawing Figures

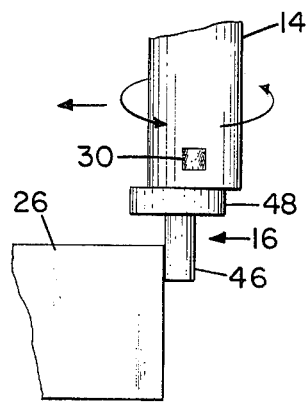
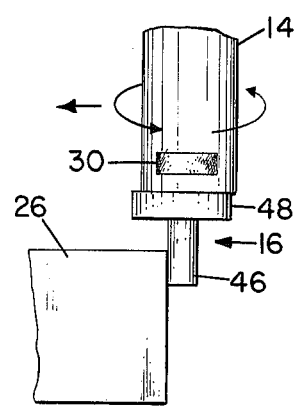
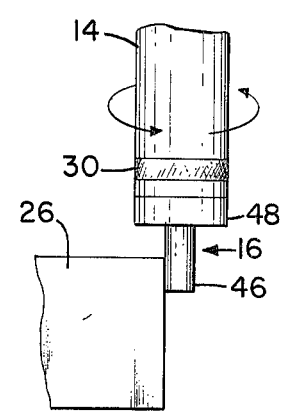
FIG. 5A      FIG. 6A      FIG. 7A
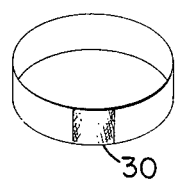
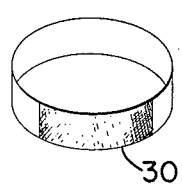
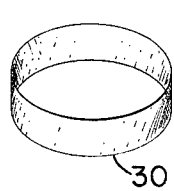
FIG. 5B      FIG. 6B      FIG. 7B
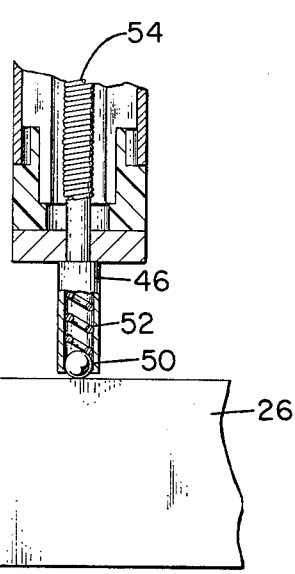
FIG. 8

MACHINIST ELECTRO-MECHANICAL DYNAMIC DATUM POINT LOCATOR TOOL

BACKGROUND OF THE INVENTION

The machining of metalwork by a machinist using his machine tools generally involves cutting, drilling and shaping of a piece of metal stock to precise measurements of the final product. Finding the exact location of the edges of a workpiece is difficult for any machinist, especially since these edges, lines, axes and, in general, datum points must be determined often within an 0.0005 inch accuracy. Many indicating tools, center finding devices, and edge locating instruments have been developed to help the machinist perform some of these determining tasks with more accuracy. There are static locator devices which incorporate an indicting light such as those devices of Mann disclosed in his U.S. Pat. No. 1,040,715 and of Pierce as disclosed in his U.S. Pat. No. 2,109,976 in which contact between a cylindrically shaped conductive locating portion of the locator device and the metal workpiece completes a circuit and illuminates a standard incandescent light bulb. Later Hopkins in his U.S. Pat. No. 3,499,226 disclosed his improved electrical connections between components in a static indicator which was lighted via energy of a battery and inserted into a chuck or the collet of a jig bore or milling machine.

In 1946, Samuel Simers in his U.S. Pat. No. 2,490,483 illustrated and described his dynamic locating device, which is a rotating tool with a flexibly attached tip, which upon contact with a workpiece turned on a standard light bulb receiving energy from a power source not contained within this rotating tool.

Simers' dynamic tool increased the accuracy and improved machining measurements by utilizing the concept of rotational eccentric to concentric alignment contact between a workpiece and the circumference of the concentric rotating tip of the locator tool.

However, the high degree of precision required for such work could still not be easily and quickly achieved because very accurate visual observation was required to determine at what precise location a light bulb was continuously on, i.e. continuous contact being made, rather than flickering, i.e. upon intermittent contact. Or as in Simers' locator tool, there was the very accurate visual observation to be made when the light bulb light had ceased completely, as the continuous contact between tip and workpiece caused an intentional short circuit.

These representative patents indicate there is still a need for quicker and more accurate determination of datum points by a machinist using a dynamic, reliable, impact resistant, compact, internally powered, light emitting, precision locator tool, which will be available at a reasonable cost.

SUMMARY OF THE INVENTION

A machinist now has available a comparatively lower cost, dynamic, reliable, impact resistant, compact, internally battery powered light emitting diode locator tool having a preset eccentrically located spring held workpiece contacting tip which reactively returns, via realignment of its spring, to its concentric location during its rotative contacts with the workpiece while being rotated in the rotating collet of a machine tool. The intermittent contacts of the tip cause the appearance of intermittent light in proportion to the length of the contacts, and the continuous contact causes the appearance to a machinist of a continuous light indicating to him the location of the edge of the workpiece relative to the outside diameter of the rotating tip of his dynamic locator tool.

This machinists' dynamic locator tool, for example used in a milling machine will help the machinists in moving the workpiece quickly and accurately and locating the edge of the workpiece clamped on the machine bed in respect to x and y axes. A second embodiment of this tool includes a lower contact ball spring biased for contacting the surface of the workpiece in determining its position along the z axis. Such locations help in determining other datum points on the workpiece, and in reference to the diameters and lengths of various cutting tools in determining tool width and length offsets with respect to the workpiece. Such determinations are made when a milling machine is preferably being rotated at one thousand revolutions per minute.

At one thousand revolutions per minute, the battery energy supplied light emitting diode is very responsive in creating its spot of light. At such speeds as the contacts increase in duration as the locator tip gradually is reactively moved from its eccentric to concentric position, the rotating spot of light soon appears to the machinist's eye as a constant circle of light. The overall circuit which is in contact with the workpiece completed through the milling machine itself is not otherwise completed.

DESCRIPTION OF THE DRAWINGS

Preferred embodiments of the machinist's electro-mechanical dynamic datum point locator tool indicating variable to continuous appearing light signals are illustrated in the drawings, wherein:

FIGS. 5A, 6A, 7A, and their counterpart FIGS. 5B, 6B, 7B, schematically illustrate the method of precisely locating the edge of a workpiece when using the locator tool shown in FIGS. 1 through 4, wherein the tip shaft, or central cylinder of the locator tool commencing in an eccentric position, upon each subsequent revolution as the workpiece is moved, is reactively moved until final continuous contact between the tip shaft and the workpiece is made, with the tip shaft then being in a concentric position within the locator tool body or barrel as shown in FIGS. 5A, 6A and 7A, and as shown in the counterpart and corresponding FIGS. 5B, 6B, and 7B showing the duration of electrical contact between the tip shaft and the workpiece appears first as a very small partial arc of light around the locator tool body, then a larger arc and eventually appearing as a full circle of light around the locator tool body during the continuing rotating of the tool holding chuck of a machine tool;

FIG. 8 is a partial view broken away to illustrate another embodiment of the locator tool, wherein a metal ball is flexibly mounted under the bias of a spring in a hollow end of the tip assembly with the peened end keeping the ball in the tip shaft, as the ball contacts a surface during movement of the locator tool along the z axis;

DESCRIPTION OF THE PREFERRED EMBODIMENT

Figure 1:
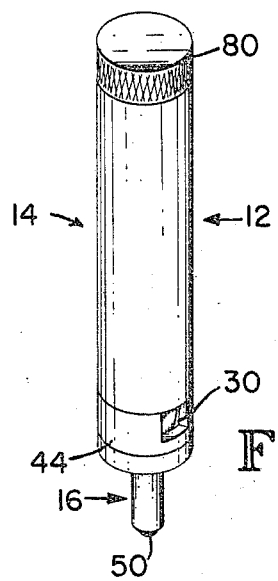
FIG. 1 is an orthographic elevational view of the machinist's electro-mechanical dynamic datum point locator tool illustrating the conductive outer tool barrel, to be fitted in the collet of a machine tool, the conductive cap and the conductive workpiece contacting flexibly held tip assembly and the single point light source positioned in an insulated housing.

The machinist's electro-mechanical dynamic datum point locator tool 12 indicating variable to continuous appearing light signals during the tool's spring held tip assembly's eccentric to concentric rotational workpiece contacts, while rotating in the collet of a machine tool is shown by itself in FIG. 1.

Figure 2:
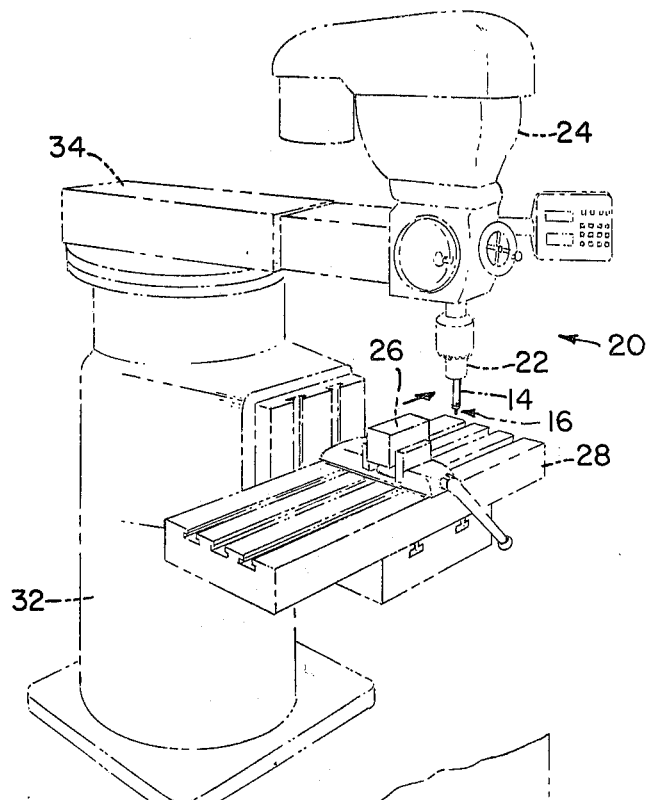
FIG. 2 is an orthographic view illustrating a typical use for the locator tool installed in an adjustable chuck of a milling machine, wherein the mill head spins the locator tool with its eccentrically preplaced flexibly supported workpiece contacting tip shaft or central cylinder as the workpiece clamped to the milling machine bed moves in proximity towards the centerline of the mill head of the milling machine until the tip shaft is concentrically rotating, such movement being indicated by a light emitting diode, creating an initial intermittent light which later appears as a continuous ring of light, dotted lines being used to illustrate the milling machine.

This locator tool 12 when viewed as assembled includes an outer tool barrel assembly 14 or small cylinder 14, or tool barrel 14, conductive threaded cap 80, or metal cap 80, a conductive, flexibly supported, tip assembly 16, an insulated collar 44 or nonconductive collar 44, and a single point light source 30. As shown in FIG. 2 the locator tool 12 is used with a machine tool such as a milling machine 20, to determine datum points with respect to three axes x, y, and z, on a workpiece 26 of metal stock. The locator tool 12 is placed in an adjustable chuck 22 or collet in a mill head 24 of the milling machine 20. A workpiece 26 of metal stock is then clamped to a milling machine bed 28, or a vice thereon, which is moved in proximity toward the locator tool.

The milling machine 20 is then set to operate at 1000 rpm and engaged, the workpiece 26 being eventually positioned by moving the machine bed 28, so the tip assembly 16, eccentrically positioned, makes rotational contacts with edge of a workpiece 26.

Figure 3:
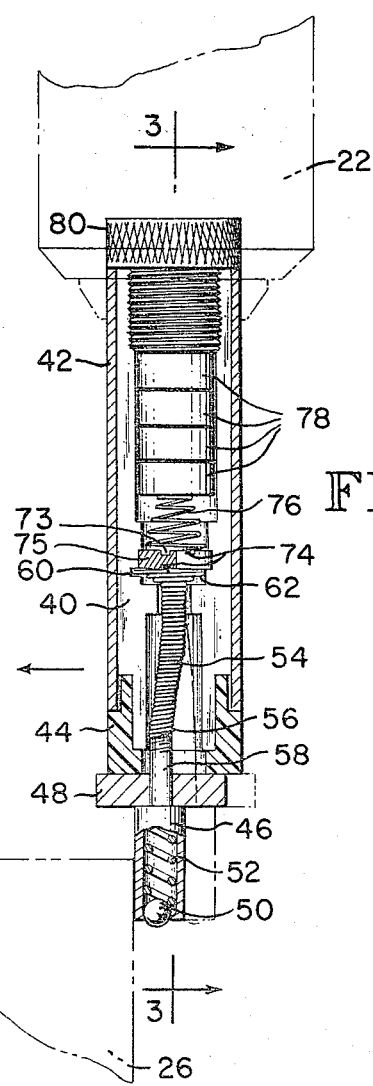
FIG. 3 is a cut away side view of the locator tool shown in FIGS. 1 and 2 illustrating the mechanical and electrical components positioned essentially within the body or barrel of the locator tool, and also indicating how the conductive workpiece contacting tip assembly is flexibly secured via a spring for movement to a starting eccentric position for its first strikes against the edge of a workpiece, while rotating in the collet of a machine tool.
Figure 4:
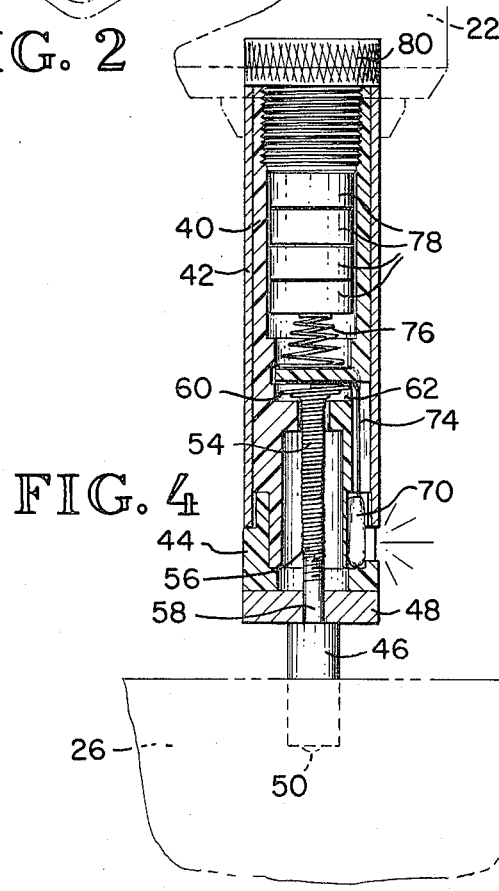
FIG. 4 is a cut away side view of the locator tool shown in FIGS. 1, 2 and 3, taken on line 3—3 of FIG. 3 showing in addition to the previously illustrated mechanical and electrical components, the resistor, wires, and the light emitting diode light source which illuminates upon contact of the tip shaft or central cylinder with the workpiece.

This eccentric to concentric movement of the tip assembly 16 of the locator tool 12 and what occurs is further illustrated in the FIGS. 3 and 4 showing the mechanical and electrical components positioned within the interior of the locator tool 12. The conductive tip assembly 16 is flexibly and pivotally secured to a hollow insulating body 40 within the tool barrel assembly 14, i.e. small cylinder 14, by a depending tension spring 54 which is electrically conductive and allows the tip assembly 16 to be moved from an eccentric to a concentric position in reference to the center of the locator tool 12. As the conductive tip shaft 46 i.e. central cylinder 46 or cylindrical tip 46 of this tip assembly 16 makes initial intermittent rotational contact with the workpiece 26, the single point light source 30 is intermittently illuminated. This eccentric to concentric movement and changing observable light pattern, is further shown in FIGS. 5A through 7A and 5B through 7B.

The tip assembly 16 is first moved to an off concentric position, i.e. eccentric position, relative to the centerline of tool barrel assembly 14, i.e. the center of the locator tool. The edge of the workpiece 26 approaches the locator tool 12 as it rotates in the mill head 24. In its eccentric position, the conductive tip shaft 46, i.e. central cylinder 46, makes only intermittent rotational contact with the edge of the workpiece 26 as illustrated in FIG. 5A. Viewing the light source 30, which always remains as a single point or single locale of a light source, through the insulated collar 44, i.e. nonconductive collar 44, while the locator tool 12 is spinning, creates the observable image to a machinist of a mirror spot or square of light as shown in FIG. 5B. As the workpiece 26 is moved farther in the direction of the locator tool 12, contact is made throughout a greater circumference of the rotating tip shaft 46 with the edge of the workpiece 26 as shown in FIG. 6A. Accordingly the single point light source 30 is illuminated for a longer period of time which results in the observed appearance by the machinist of an arc of light as illustrated in FIG. 6B. Finally, when centerlines of the mill head and the locator tool 12 are almost directly in line with the edge of the workpiece 26, except for one half the width of the tip shaft 46, the tip shaft 46 is then making continuous concentric rotational contact with the edge of the workpiece 26 as shown in FIG. 7A. At this operation stage, the arc of light appears to the machinist as a complete circle of 360 degrees as though it was wrapping around the rotating locator tool 12, as illustrated in FIG. 7B.

This procedure helps to establish an initial datum point, for example in reference to the x axis. The final establishment of this datum point is achieved by stopping the milling machine 20 and removing the locator tool 12 from the adjustable chuck 22. The milling machine bed 28, with the clamped workpiece 26, is then moved half the diameter of the tip shaft 46 closer to the centerline of the millhead 24. At this point the centerline of the mill head 24 is located directly above the edge or datum point desired on the workpiece 26. A similar procedure is followed to determine a datum point in reference to the y axis. Any coordinate may then be located on the surface of the workpiece 26 with respect to the x and y axes.

As shown by FIG. 8, another embodiment of the tip assembly 16 includes a spring biased metal ball 50 fitted into a hollow end 51 of the modified tip shaft 53 or alternative tip embodiment 53 and held therein by crimping the entry of the hollow end 51. In a manner similar to finding the "x" and "y" axis edges of a workpiece 26, the top surface in reference to the "z" axis may be located by moving the rotating locator tool 12 in proximity to the surface below until rotational contact is made between the ball 50 and the workpiece 26, thereby illuminating the single point light source 30, creating the observable image of an arc of light on the circumference of the tool body 14.

Figure 9:
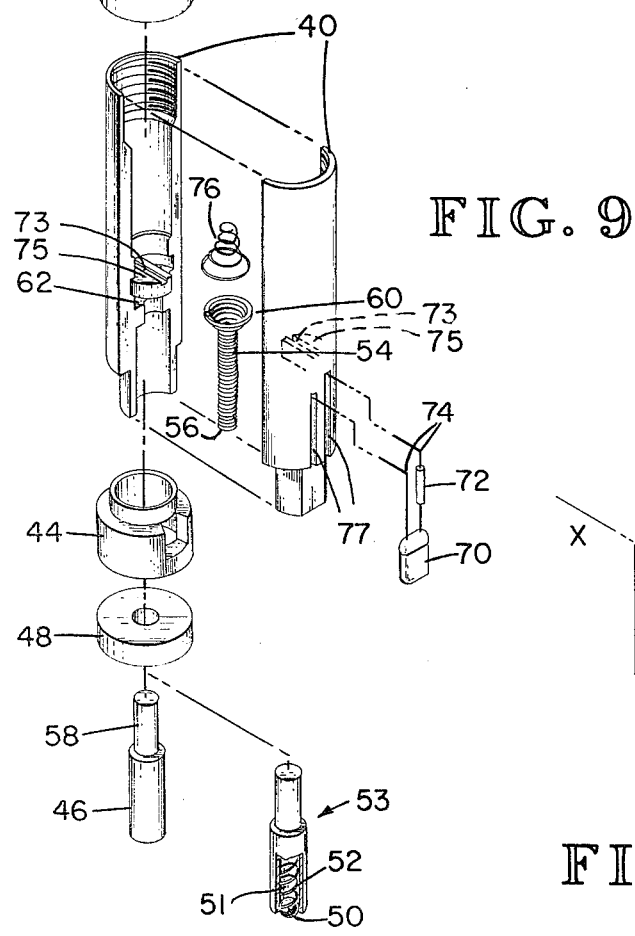
FIG. 9 is an orthographic exploded view of the various components of the locator tools, shown in FIGS. 1 through 8, illustrating more clearly, for example, both halves of the interior insulated housing body, the alternative tip assembly, the mechanical components and the electrical components.

Both embodiments of the rotating locator tool 12 are shown in the exploded view of FIG. 9. Within the tool barrel assembly 14, is a hollow insulating body 40, formed in two halves of molded plastic, and fitted together for slidable insertion through a conductive tubular sleeve 42 of the tool barrel 14. Thereafter the insulative or nonconductive collar 44 and conductive tip assembly 16 are also inserted. The hollow insulating body 40 contains various molded cavities to secure and house the other mechanical and electrical internal components of the locator tool 12, as well as to insulate them from the conductive tubular sleeve 42.

The conductive tip assembly 16 in the first embodiment, comprises a conductive tip shaft 46, i.e. cylindrical tip 46 or central cylinder 46, which is firmly secured to the conductive collar 48 as a subassembly 16. The modified tip shaft 53 in a second embodiment contains a metal ball 50 spring biased and captively mounted within a hollow end 51, of the modified tip shaft 53, i.e. alternative tip embodiment 53, and kept in a downward protruding position by metal spring 52 as shown in FIG. 9. These embodiments of the tip assembly 16 are respectively secured within the insulating body 40 by their attachment to a tension spring 54, at its tension end 56 to the spring adaptive portion 58 of the tip shaft 46 in the first embodiment and the modified tip shaft in the second embodiment, and the tension spring 54 is in turn secured to the insulating body 40 at its enlarged top 60 which is compressed into a molded spring cavity 62 of the hollow insulating body 40. This tension spring 54 is conductive and allows the tip assembly 16 to be pivotally and flexibly maneuvered from its eccentric to concentric operating positions. An insulating collar 44, i.e. nonconductive collar 44, is positioned between the conductive collar 48 of the tip assembly 16 and both the conductive tubular sleeve 42 and the insulating body 40, with its exterior being flush with the exterior of the locator tool barrel assembly 14. The insulation collar 44 contains a cut away portion, through which the single point light source may be observed.

The electronic and electrical components comprise: the single point light source 30 which is a low power consumptive, short response time, light emitting diode often referred to as an LED 70, which is seated or positioned in the cut away portion of the insulating collar 44 and partially overlapped about its top edge by the tubular sleeve 42; a limiting resistor 72 to prolong the life of the batteries; conductive lead wires 74 to and from the LED 70 which are positioned in slots 77 and 73 respectively of the hollow insulating body 40 and insulating abutment 75 or abutment disc 75 which is integrally molded within disc 75 in the insulating body 40 as two matching halves which when fitted together with the insulating body 40 half, form disc-like abutments. So one conductive lead wire 74 above the insulating abutment 75 contacts the compression spring 76 and one conductive lead wire 74 below contacts the tension spring 54; four batteries 78 for insertion into the insulated body 40 in another cavity with the conductive compression spring 76, to provide approximately six volts of electricity; and a metal cap 80 threaded into the top end of the hollow insulating body 40 making electrical contact with the batteries 78 and also the outer tubular conductive sleeve 42 positioning the batteries against the compression spring 76.

Figure 10:
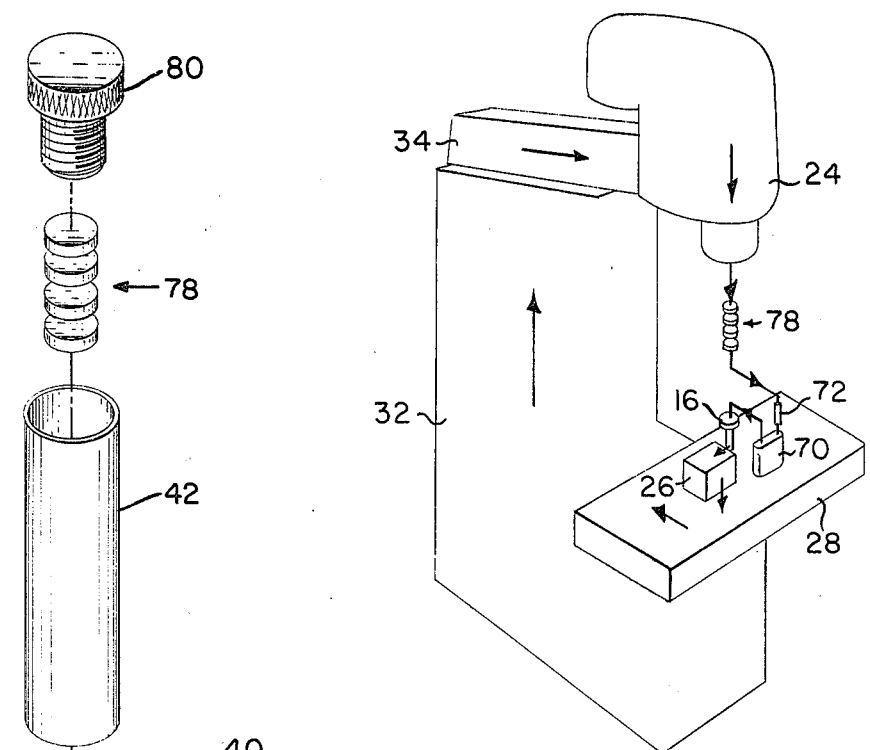
FIG. 10 is a schematic showing how the electrical circuit is completed from the tip shaft of the locator tool through the workpiece, throughout the milling machine, back through the components of the locator tool completing the circuit to energize the light emitting diode.

As shown by FIGS. 3, 4, and 9, the internal electromechanical components of the locator tool 12 are arranged in series, with the potential electrical circuit current flowing through the cap 80, batteries 78, compression spring 76, one lead wire 74, LED 70, limiting resistor 72, another lead wire 74, tension spring 54 and conductive tip assembly 16. As further shown by FIG. 10, the overall circuit is completed through the milling machine 20 and its components. During operations when the locator tool 12 is being rotated, as the tip assembly 16 strikes the workpiece 26, the overall circuit is completed from the tip assembly 16, through the workpiece 26, the milling machine bed 28, mill pedestal 32, running gear 34 of the milling machine, milling head 24, chuck or collet 22, the conductive sleeve 42 of the locator tool 12 and on through its components: metal cap 80, batteries 78, compression spring 76, one lead wire 74, LED 70, limiting resistor 72, another lead wire 74, tension spring 54 and back to the tip assembly 16.

Figure 11:
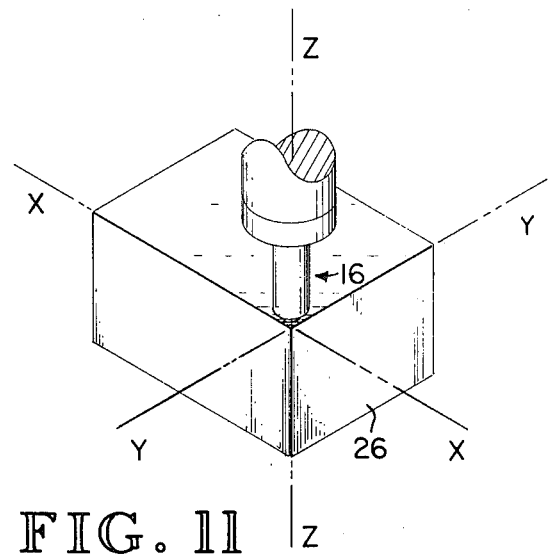
FIG. 11 is a partial schematic orthographic view showing the locator tool's tip assembly adjacent a workpiece to illustrate the relative positioning of the x, y, and z axes with respect to both of them.

FIG. 11 schematically illustrates the positioning of the x, y and z axes with respect to a workpiece 26 and the tip assembly 16, to assist in one's understanding of how effectively the machinist uses this locator tool 12 in determining datum points on the workpiece in respect to these axes.

I claim:

1. A machinist's electro-mechanical dynamic datum point locator tool, indicating variable to continuous appearing light signals at the circumference of the locator tool, during the tool's spring held tip's eccentric to concentric rotational workpiece contacts while rotating in the collet of a mill head of a machine tool, comprising:
   (a) a small cylinder or tool barrel for placement, for example, in an adjustable chuck or collet in a mill head of a milling machine, wherein the small cylinder is a subassembly comprising, in turn:
      (i) a conductive tubular sleeve;
      (ii) a hollow insulating body closely fitted within the tubular sleeve and made in two longitudinal halves which when assembled define several chambers and a disc like abutment to receive the electro-mechanical means;
      (iii) a conductive externally threaded metal cap threaded down into the top of this interior insulating sleeve; and
      (iv) a non conductive bottom collar having a circumferential space to receive the light emitting diode, a lower central opening to receive the depending tip assembly, and a formed top for placement into both the lower end of the conductive tubular sleeve and the hollow insulating body, following the earlier insertion of the insulating body together with the electro-mechanical means into the conductive tubular sleeve;

(b) a tip assembly flexibly supported and depending from the small cylinder for eccentric preplacement rotation, continuing less eccentric rotation, and final concentric rotation immediately adjacent an edge of a workpiece held in place on the bed of the milling machine;

(c) a light emitting diode supported in the small cylinder at its circumference to emit light from a small area of the small cylinder, whenever the initially eccentrically placed tip assembly touches an edge of a workpiece, and as the edge of the workpiece is moved closer to being in line with the centerline of the millhead of the milling machine and the tip assembly is reactively moved progressively toward its concentric rotating position then this light emitting diode stays on longer during this return movement of this tip assembly, until its spot source of light at its circumference is continuously turned on and by virture of its speed of rotation the light appears to an observing machinist as a continuous ring of light or halo of light indicating to him that the center line of the chuck or collet and the mill head of the milling machine is only away from the edge of the workpiece by a distance equal to one half of the diameter of the cylindrical tip of the tip assembly of this locator tool; and (d) electro-mechanical means to complete a potential circuit through the locator tool from its small cylinder, through the light emitting diode, and on to the cylindrical tip, which circuit is ultimately completed through the workpiece and the milling machine.

2. A machinist's locator tool, as claimed in claim 1, wherein the electro-mechanical means installed within the chamber of the assembled halves of the hollow insulating body, as arranged from top to bottom, comprises in turn:

(a) a battery means in contact with the above conductive threaded cap;

(b) a compression spring in contact with the above battery means;

(c) a conductive lead wire in contact with the above compression spring and extending downwardly to the circumferentially positioned light emitting diode;

(d) an insulating abutment, integrally formed within the hollow insulating body to receive the top end of this upper conductive wire and also the bottom of this compression spring;

(e) another conductive lead wire located adjacent the bottom of this insulating abutment integrally formed within the hollow insulating body and extending downwardly through the limiting resistor to the light emitting diode;

(f) a depending tension spring abutting at its top both the other conductive wire and the bottom of the insulating abutment and extending downwardly within the hollow insulating body with clearance all around this spring permitting its sidewise flexure and being sized at its lower end to frictionally fit over the tip assembly tip, which is initially preset in an eccentric position before the locator tool is installed and rotated to determine a machinist's datum point in reference to an x or y axis.

3. A machinist's locator tool, as claimed in claim 2, wherein the tip assembly flexibly supported and depending from the small cylinder, comprises, in turn, a tip subassembly of a central cylinder or tip shaft, larger in diameter at the bottom for contacting the workpiece, a smaller adaptive portion at the top for insertion within the end of the depending tension spring, and firmly receiving a conducting collar around the adaptive portion adjacent to its larger diameter portion with the exterior diameter of this conducting collar matching the like exterior diameters of both the bottom non conducting collar and the outer conductive tubular sleeve, so when they are all aligned, they appear as the continuation of the outer overall surface of the small cylinder of this machinist's locator tool.

4. A machinist's locator tool, as claimed in claim 3, wherein the central cylinder of the tip sub assembly has a larger diameter bottom formed with a hollow interior, and a spring is inserted, then a metal ball is inserted, thereafter the entry of the hollow interior is slightly peened over to retain the metal ball as it protrudes below the larger diameter bottom to first touch a surface of a workpiece as a machine tool head is lowered and thereafter to commence the completion of a circuit, causing in turn the circumferentially located light emitting diode to function to create the appearance of a halo of light to indicate to a machinist the location of this surface of the workpiece in reference to the z axis.

5. A machinist's electro-mechanical dynamic datum point locator tool, with respect to x and y axes, indicating variable to continuous appearing circumferential located light signals while rotating in a collet or chuck in the mill head of a machine tool, during the tool's spring held tip assembly's eccentric to concentric rotational workpiece contacts, comprises:

(a) a tool barrel assembly for insertion in a collet or chuck of a machine tool and to depend therefrom wherein the tool barrel assembly is a subassembly comprising, in turn:

(i) a conductive tubular sleeve;

(ii) a hollow insulating body closely fitted within the tubular sleeve and made in two longitudinal halves which when assembled define several chambers and a disc like abutment to receive the electro-mechanical means;

(iii) a conductive externally threaded metal cap threaded down into the top of this interior insulating sleeve; and (iv) a non-conductive bottom collar having a circumferential space to receive the light emitting diode, a lower central opening to receive the depending tip assembly, and a formed top for placement into both the lower end of the conductive tubular sleeve and the hollow insulating body, following the earlier insertion of the insulating body together with the electro-mechanical means into the conductive tubular sleeve;

(b) a workpiece contacting tip assembly flexibly mounted on the tool barrel assembly and depending therefrom for initial preset eccentric positioning and for reactive movements upon contacting a workpiece to return to a concentric position on the centerlines of both the locator tool and of the mill head of a machine tool;

(c) a light emitting diode installed in the tool barrel assembly, at its circumference, for providing a source of spot lighting when during rotation of the locator tool in a machine tool, the workpiece contacting tip assembly preset eccentrically touches the workpiece to complete a circuit throughout the locator tool and the machine tool, the observed lighting thereafter eventually appearing as a halo of light, when the contacting tip assembly again becomes concentric to the tool barrel assembly; and (d) electro-mechanical means positioned within the tool barrel assembly to complete the overall circuit through the locator tool and to be flexibly connected to the work contacting tip assembly.

6. In combination with a machine tool and an adjustable chuck or collet and a workpiece, a machinist's electro-mechanical dynamic datum point locator tool, indicating variable to continuous appearing light signals at the circumference of the locator tool, during the tool's spring held tip assembly's eccentric to concentric rotational workpiece contacts while rotating in the adjustable chuck or collet of a machine tool, comprising:

(a) a cylinder for placement, for example, in an adjustable chuck or collet of a tool, wherein the small cylinder is a subassembly comprising, in turn
  (i) a conductive tubular sleeve;
  (ii) a hollow insulating body closely fitted within the tubular sleeve and made in two longitudinal halves which when assembled define several chambers and a disc like abutment to receive the electro-mechanical means;
  (iii) a conductive externally threaded metal cap threaded down into the top of this interior insulating sleeve; and
  (iv) a non conductive bottom collar having a circumferential space to receive the light emitting diode, a lower central opening to receive the depending tip assembly, and a formed top for placement into both the lower end of the conductive tubular sleeve and the hollow insulating body, following the earlier insertion of the insulating body together with the electro-mechanical means into the conductive tubular sleeve;

(b) a tip assembly flexibly supported and depending from the small cylinder for eccentric preplacement rotation, continuing less eccentric rotation, and final concentric rotation immediately adjacent an edge of a workpiece held in place on the bed of the machine tool;

(c) a single point light supported in the cylinder at its circumference to emit light from an area of the cylinder, whenever the initially eccentrically placed tip touches an edge of a workpiece, and as the edge of the workpiece is moved closer to being in line with the collet or adjustable chuck of the machine tool and the tip assembly is reactively moved progressively toward its concentric rotating position then this single point light stays on longer during this return movement of this tip assembly, until its spot source of light at its circumference is continuously turned on and by virtue of its speed of rotation the light appears to an observing machinist as a continuous ring of light or halo of light indicating to him that the center line of the adjustable chuck or collet and the machine tool is only away from the edge of the workpiece by a distance equal to one half of the width of the tip assembly of this locator tool where it is contacting the workpiece; and (d) electro-mechanical means to complete a potential circuit through the locator tool from its cylinder, through the single point light and on to the tip assembly, which circuit is ultimately completed through the workpiece and the machine tool.

7. A machinist's electro-mechanical dynamic datum point locator tool, indicating variable to continuous circumferentially appearing light signals on the locator tool, during the tool's spring held tip's eccentric to concentric rotational workpiece contacts while rotating in the collet of a mill head of a machine tool, comprising:

(a) a small cylinder or tool barrel for placement, for example, in an adjustable chuck or collet in a mill head of a milling machine;

(b) a tip assembly flexibly supported and depending from the small cylinder for eccentric preplacement rotation, continuing less eccentric rotation, and final concentric rotation immediately adjacent an edge of a workpiece held in place on the bed of the milling machine;

(c) a light emitting diode supported in the small cylinder to emit a light signal from a small area of the circumference of the small cylinder so the light signal initially appears to a machinist as a spot of light whenever the initially eccentrically placed tip assembly touches an edge of a workpiece, and which appears thereafter as a progressively extending arc of light around the circumference of the small cylinder as the edge of the workpiece is moved closer to being in line with the centerline of the millhead of the milling machine, the length of the arc being proportional to the length of the contacts of the tip assembly with the workpiece and as the tip assembly is reactively moved progressively toward its concentric rotating position then this light emitting diode stays on longer during this return movement of this tip assembly, until the light signal at the circumference is continuously emitted and by virtue of its speed of rotation the observed arc of light now appears to the machinist as a continuous ring of light or halo of light indicating to him that the center line of the chuck or collet and the mill head of the milling machine is only away from the edge of the workpiece by a distance equal to one half of the diameter of the cylindrical tip of the tip assembly of this locator tool; and (d) electro-mechanical means to complete a potential circuit through the locator tool from its small cylinder, through the light emitting diode, and on to the cylindrical tip, which circuit is ultimately completed through the workpiece and the milling machine.

8. A machinist's electro-mechanical dynamic datum point locator tool, with respect to x and y axes, indicating variable to continuous appearing circumferential located light signals while rotating in a collet or chuck in the mill head of a machine tool, during the tool's spring held tip assembly's eccentric to concentric rotational workpiece contacts, comprises:

(a) a tool barrel assembly for insertion in a collet or chuck of a machine tool and to depend therefrom having a conducting exterior across its top and down its sides, and a multi-chambered insulated interior to hold electro-mechanical means;

(b) a workpiece contacting tip assembly flexibly mounted on the tool barrel assembly and depending therefrom for initial preset eccentric positioning and for reactive movements upon contacting a workpiece to return to a concentric position on the centerlines of both the locator tool and of the mill head of a machine tool;

(c) a light emitting diode installed in the circumference of the tool barrel assembly, for providing a single source of lighting when during rotation of the locator tool in a machine tool, appears to the machinist as a spot of light as the workpiece contacting tip assembly, preset eccentrically, touches the workpiece to complete a circuit throughout the locator tool and the machine tool, and which appear thereafter as a progressively extending arc of light around the circumference of the small cylinder as the workpiece is moved closer to being in line with the center line of the mill head of the milling machine and the light emitting diode staying on longer and the length of time of the contact of the tip assembly with the workpiece becomes greater, the length of the arc being proportional to the length of time of contact of the tip assembly until the observed arc of light thereafter eventually appears as a halo of light, when the contacting tip assembly again becomes concentric to the tool barrel assembly; and (d) electro-mechanical means positioned within the tool barrel assembly to complete the overall circuit through the locator tool and to be flexibly connected to the work contacting tip assembly.

9. In combination with a machine tool and an adjustable chuck or collet and a workpiece, a machinist's electro-mechanical dynamic datum point locator tool, indicating variable to continuous appearing light signals at the circumference of the locator tool, during the tool's spring held tip assembly's eccentric to concentric rotational workpiece contacts while rotating in the adjustable chuck or collet of a machine tool, comprising:

(a) a cylinder for placement, for example, in an adjustable chuck or a collet of a tool;

(b) a tip assembly flexibly supported and depending from the small cylinder for eccentric preplacement rotation, continuing less eccentric rotation, and final concentric rotation immediately adjacent an edge of a workpiece held in place on the bed of the machine tool;

(c) a single point light circumferentially supported in the cylinder to emit light from an area of the cylinder, which appears to a machinist as a spot of light whenever the initially eccentrically placed tip touches an edge of a workpiece, and as the edge of the workpiece is moved closer to being in line with the collet or adjustable chuck of the machine tool and the tip assembly is reactively moved progressively toward its concentric rotating position then this single point light stays on longer during this return movement of this tip assembly, and the observed spot of light becomes a progressively extending arc of light around the circumference of the small cylinder, the length of the arc being proportional to the length of the contacts of the tip assembly with the workpiece of the cylinder, until the spot source of light at the circumference of the cylinder is continuously turned on and by virtue of the speed of rotation the light appears to the machinist as the observed extending arc appears to circumferentially surround the small cylinder as a continuous ring of light or halo of light indicating to him that the center line of the adjustable chuck or collet and the machine tool is only away from the edge of the workpiece by a distance equal to one half of the width of the tip assembly of this locator tool where it is contacting the workpiece; and (d) electro-mechanical means to complete a potential circuit through the locator tool from its cylinder, through the single point light and on to the tip assembly, which circuit is ultimately completed through the workpiece and the machine tool.

* * * * *